March 30, 1926.                                                              1,578,857
H. O. SIEGMUND ET AL
ELECTRODE FOR ELECTROLYTIC CELLS
Filed August 21, 1923
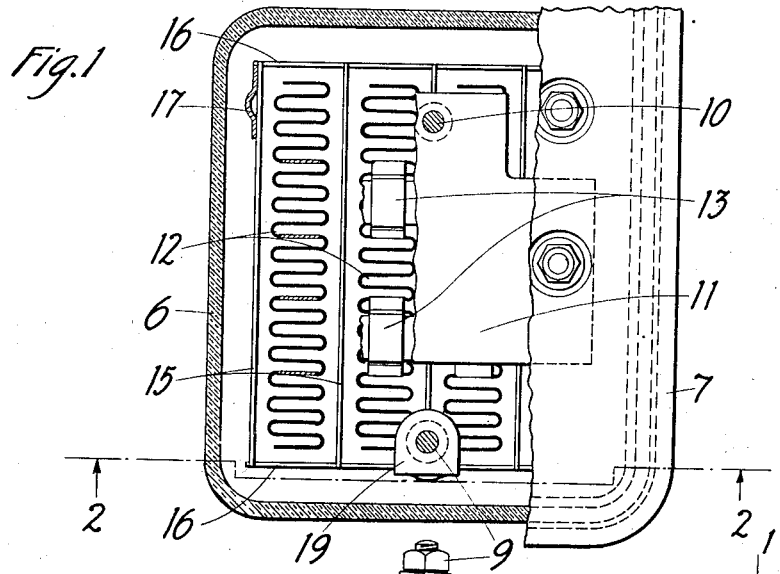
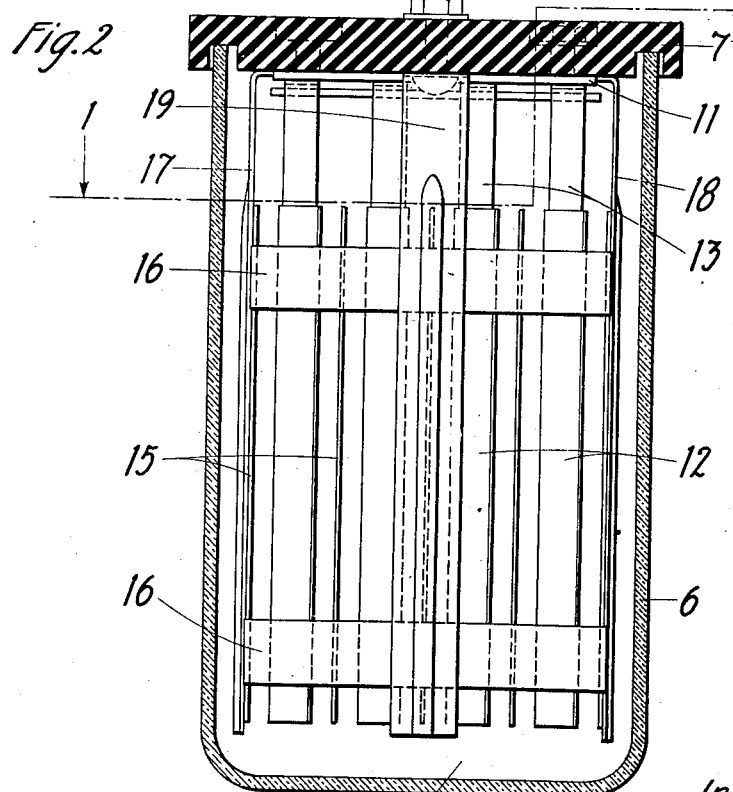
Inventors:
Humphreys O. Siegmund
Ben E. Brown
by Joel C. R. Palmer   Att'y Patented Mar. 30, 1926.

1,578,857

UNITED STATES PATENT OFFICE.

HUMPHREYS O. SIEGMUND, OF WEST ORANGE, NEW JERSEY, AND BEN ELI BROWN, OF NEW YORK, N. Y., ASSIGNORS TO WESTERN ELECTRIC COMPANY, INCORPORATED, OF NEW YORK, N. Y., A CORPORATION OF NEW YORK.

ELECTRODE FOR ELECTROLYTIC CELLS.

Application filed August 21, 1923. Serial No. 658,522.

*To all whom it may concern:*

Be it known that we, HUMPHREYS O. SIEGMUND and BEN E. BROWN, citizens of the United States of America, residing at West Orange, in the county of Essex, State of New Jersey, and at New York, in the county of New York and State of New York, respectively, have invented certain new and useful Improvements in Electrodes for Electrolytic Cells, of which the following is a full, clear, concise, and exact description.

This invention relates to electrolytic cells, and its object is to provide a simple and highly efficient cell for use as an electrolytic condenser for use across circuits of uni-directional potential.

In accordance with the general features of the invention, there is provided a cell having a cathode member composed of a non-film-forming material which is cheap, efficient, durable and mechanically strong.

The drawings illustrates a cell embodying certain of these features.

Fig. 1 is a sectional view of such a cell along the line 1—1 in Fig. 2.

Fig. 2 is a cross-sectional view in side elevation of such a cell along the line 2—2 in Fig. 1.

An electrolyte 5 is contained in an insulating casing 6 over which a cover 7 is fitted tightly without being hermetically sealed, in order to prevent the formation of any deposit due to evaporation upon the electrodes near the surface of the electrolyte and yet to allow for the escape of evolved gases. Because of the evolution of these gases during operation, the cell should not be made entirely air-tight, but it has been found that the provision of a cover which fits tightly over the casing 6 allows these gases to escape, and at the same time so restricts the circulation of air as to prevent any marked evaporation of the electrolyte, which commonly creeps up on the electrodes and forms deposits thereon as it is evaporated. A cell having a cover of this character is disclosed and claimed in our copending application, Serial No. 737,978, filed September 16, 1924.

A negative terminal 9 and a positive terminal 10 are set in the top of this cover 7. The positive terminal 10 is connected to a holding plate 11 which is fastened to the under side of the cover and serves to support one or more, preferably corrugated, anodes 12 which are attached thereto by means of integral extensions 13 extending out of the electrolyte. A plurality of cathode members 15 are arranged alternately with the anodes 12 and are held together by cross-bars 16 which are attached to the cover by means of vertical bars 17, 18 and 19, the bar 19 being connected to the negative terminal 9.

The anodes 12 are composed of film coated aluminum, but in a condenser to be used across circuits of unidirectional potential it is desirable that the cathode members 15 to 19 be composed of a "non-film-forming" material, that is a material upon which such a continuous film as will appreciably interfere with its operation as a negative electrode will not be formed under service conditions. Although various non-film-forming materials have been used as cathodes in electrolytic condensers of this type, none of them have the numerous desirable chemical and mechanical properties which have rendered aluminum plates extremely satisfactory for use as the anodes of electrolytic condensers. In accordance with this invention, the cathode members are made of impure aluminum, preferably aluminum containing a small percentage of silicon. The silicon, being distributed throughout the aluminum members, prevents the formation of a continuous film on the aluminum member without deleteriously affecting its other chemical and mechanical properties. Thus there is provided a non-film-forming cathode which is as advantageous chemically and mechanically as are the film-forming anodes. Aluminum containing more than $\frac{1}{3}$ of 1% of silicon should be used; and aluminum containing less than 5% of silicon has been found to be most satisfactory for this purpose; aluminum containing about 2% of silicon being somewhat preferable.

Any satisfactory film forming electrolyte may be employed with the electrodes of the invention to form a satisfactory electrolytic cell. An electrolyte composed, for example, of ammonia and boric acid in variable proportions has been found satisfactory.

The invention claimed is:

1. An electrode for electrolytic cells composed of aluminum and other material in such proportions as to be substantially non-film forming, said other material being inert to the action of film-forming electrolytes.

2. A non-film-forming electrode for electrolytic condensers composed of aluminum containing from one third of one per cent to five per cent of silicon.

3. An electrode for electrolytic cells composed of aluminum and silicon in such proportions as to be non-film forming.

4. An electrode for electrolytic cells composed of aluminum containing from ⅓ of 1% to 5% of other material, said other material being substantially non-film forming.

In witness whereof, we hereunto subscribe our names this 14th day of August A. D., 1923.

HUMPHREYS O. SIEGMUND.
BEN ELI BROWN.